United States Patent
Subramanian et al.

(10) Patent No.: US 9,230,229 B2
(45) Date of Patent: Jan. 5, 2016

(54) PREDICTING LEVELS OF INFLUENCE

(71) Applicants: Venkitesh Subramanian, Palo Alto, CA (US); Prerna Makanawala, Palo Alto, CA (US); Niyanth Kudumula, Palo Alto, CA (US); Preeta Kulavil, Palo Alto, CA (US); Praveen Kalla, Palo Alto, CA (US); Jean-Francois Desjeans Gauthier, Palo Alto, CA (US); Kedar Shiroor, Palo Alto, CA (US); Abhijit Mitra, Palo Alto, CA (US); Karan Sood, Palo Alto, CA (US)

(72) Inventors: Venkitesh Subramanian, Palo Alto, CA (US); Prerna Makanawala, Palo Alto, CA (US); Niyanth Kudumula, Palo Alto, CA (US); Preeta Kulavil, Palo Alto, CA (US); Praveen Kalla, Palo Alto, CA (US); Jean-Francois Desjeans Gauthier, Palo Alto, CA (US); Kedar Shiroor, Palo Alto, CA (US); Abhijit Mitra, Palo Alto, CA (US); Karan Sood, Palo Alto, CA (US)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/057,992

(22) Filed: Oct. 18, 2013

(65) Prior Publication Data

US 2015/0112893 A1    Apr. 23, 2015

(51) Int. Cl.
*G06Q 10/06*    (2012.01)

(52) U.S. Cl.
CPC ................... *G06Q 10/0639* (2013.01)

(58) Field of Classification Search
CPC .................................................. G06F 17/30
See application file for complete search history.

(56) References Cited

U.S. PATENT DOCUMENTS

| | | | |
|---|---|---|---|
| 7,730,509 B2 | 6/2010 | Boulet et al. | |
| 7,752,190 B2 | 7/2010 | Skinner | |
| RE42,870 E | 10/2011 | Seibel et al. | |
| 8,146,126 B2 | 3/2012 | Downey | |
| 2005/0137939 A1 | 6/2005 | Calabria et al. | |
| 2005/0144064 A1 | 6/2005 | Calabria et al. | |
| 2006/0293955 A1 | 12/2006 | Wilson et al. | |
| 2007/0162379 A1 | 7/2007 | Skinner | |
| 2007/0261072 A1 | 11/2007 | Boulet et al. | |
| 2008/0021818 A1 | 1/2008 | Fish | |
| 2008/0243812 A1 | 10/2008 | Chien et al. | |
| 2009/0192918 A1 | 7/2009 | Hood et al. | |
| 2009/0204582 A1* | 8/2009 | Grandhi et al. | 707/3 |
| 2010/0030597 A1 | 2/2010 | Lewis, Jr. et al. | |
| 2010/0060643 A1* | 3/2010 | Kolipaka et al. | 345/440 |
| 2011/0213655 A1 | 9/2011 | Henkin et al. | |
| 2011/0238495 A1 | 9/2011 | Kang | |
| 2011/0307464 A1* | 12/2011 | Ghosh | 707/706 |
| 2012/0203584 A1 | 8/2012 | Mishor et al. | |
| 2012/0229466 A1 | 9/2012 | Riche et al. | |
| 2013/0031105 A1* | 1/2013 | Stibel et al. | 707/748 |
| 2015/0006241 A1* | 1/2015 | Jamal et al. | 705/7.29 |
| 2015/0089422 A1* | 3/2015 | Spaulding et al. | 715/771 |
| 2015/0112755 A1 | 4/2015 | Potdar et al. | |
| 2015/0112764 A1 | 4/2015 | Augustine et al. | |
| 2015/0112893 A1 | 4/2015 | Subramanian et al. | |

FOREIGN PATENT DOCUMENTS

WO    W09900749 A1    1/1997

* cited by examiner

*Primary Examiner* — Alan Chen (74) *Attorney, Agent, or Firm* — Fountainhead Law Group PC (57) ABSTRACT

Systems and method for identifying individuals who may be potentially influential on a particular identified contact for a particular sales opportunity are disclosed. The individuals identified as potential influencers are then ranked according to a predicted level of influence and displayed in a graphic representation. In one embodiment, the ranked potential influencers are displayed as icons in a spiral formation relative to an icon representing the identified contact. The closer an icon representing a particular potential influencer is to the icon representing the identified contact, the greater the level influence is that that influencer might have on the identified contact.

20 Claims, 8 Drawing Sheets

PREDICTING LEVELS OF INFLUENCE

BACKGROUND

The present disclosure relates to the utilization of business system information, and in particular, to systems and methods for identifying and evaluating potentially influential people on a given contact or a particular sales opportunity.

Unless otherwise indicated herein, the approaches described in this section are not prior art to the claims in this application and are not admitted to be prior art by inclusion in this section.

One of the major functions of a salesperson is to identify potential sales opportunities. The sales opportunities are typically defined by the potential for sale of a particular product to a particular entity, such as a customer company or organization. Once a potential sales opportunity is identified, it is typically up to a salesperson to identify the appropriate personnel (e.g., a purchasing manager or project manager) within the particular entity with whom he should make contact.

Traditionally, contact information, such as name, title, email address, telephone number, and the like, for contacts within customer entities, is stored in electronic business system databases (e.g., a customer relationship management (CRM) system). For example, the business system database may store records for each contact regarding their title, role, or responsibilities. Using such information, the salesperson can easily identify a potentially helpful contact. Specifically, a salesperson may search the contact information records for contacts within a potential customer's organization who may be responsible decision makers for the products and/or projects related to the identified sales opportunity.

Once the appropriate contact is identified, the sales person, and/or team of salespeople, must determine an effective strategy to contact, communicate with, and successfully close a deal with the identified contact. In some scenarios, an effective strategy can include asking fellow salespeople or contacts within the customer entity who have had previous relationships or professional dealings with the identified contact to provide an introduction. In some scenarios, it may even be helpful to ask those with a previous relationship or demonstrated level of influence to be included as part of the sales team, or otherwise be involved with the initiation, negotiation, and or close of the sales opportunity. Such individuals who have previous relationships with the identified contact are referred to herein as "influencers".

While many individuals, both contacts and fellow employees, may have had previous relationships and/or dealings with the identified contact, it may not be beneficial to include all such individuals as part of the particular sales opportunity. In general, it is best to include the most positively influential individuals in the sales opportunity.

SUMMARY

Embodiments of the present disclosure improve systems and methods for predicting the most influential people on a given contact. One embodiment includes a method comprising: generating a list of object identifiers associated with a root object identifier and retrieving a ranking rule from a ranking rule library. The ranking rule may include criteria for evaluating a degree of influence of an object on the root object with respect to a particular sales opportunity. Such method may also include analyzing a plurality of objects associated with the list of object identifiers according to the ranking rule to generate an ordered list, and generating a graphical user interface (GUI) comprising a graphical representation of the ordered list comprising a plurality of icons representing the plurality of objects associated with the list of object identifiers and an icon representing the root object, wherein the plurality of icons representing the plurality of objects are sized and positioned relative to the icon representing the root object according to ordered list.

In one embodiment, generating the list of object identifiers includes receiving the root object identifier associated with the root object, where the root object can be associated with the particular sales opportunity, and searching a database comprising records having attributes and corresponding attribute values, for a plurality of records in which the root object identifier is included as an attribute value for at least one attribute, and identifying a plurality object identifiers also included as attribute values for an attribute in one or more of the plurality of records.

In one embodiment, the criteria for evaluating the degree of influence comprise a plurality of routines for generating scores based on attribute values for particular attributes.

In one embodiment, searching the database includes filtering the plurality of records by one or more attributes for which the root object identifier is included as an attribute.

In one embodiment, the method also includes receiving user input through the graphical user interface representing moving a selected icon to a new position in the GUI, and updating an attribute associated with the selected object represented by the selected icon according to the input.

In one embodiment, the sales opportunity includes a description of a potential sale and root object identifier, wherein the root object comprises information regarding a person responsible for the sales opportunity, and the root object identifier comprises a name of the person.

In one embodiment, the criteria for evaluating the degree of influence comprise a plurality of routines for generating scores based on the information regarding the person responsible for the sales opportunity.

Another embodiment includes a non-transitory computer readable medium comprising instructions that when executed by a computer processor cause the computer processor to be configured for: generating a list of object identifiers associated with a root object identifier, retrieving a ranking rule from a ranking rule library, wherein the ranking rule comprises criteria for evaluating a degree of influence of an object on the root object with respect to a particular sales opportunity; analyzing a plurality of objects associated with the list of object identifiers according to the ranking rule to generate an ordered list, and generating a graphical user interface (GUI) comprising a graphical representation of the ordered list comprising a plurality of icons representing the plurality of objects associated with the list of object identifiers and an icon representing the root object, wherein the plurality of icons representing the plurality of objects are sized and positioned relative to the icon representing the root object according to ordered list.

Yet another embodiment includes a system having a processor and a non-transitory computer readable medium having instructions stored thereon that when executed by the processor cause the processor to be configured to: generate a list of object identifiers associated with a root object identifier, retrieve a ranking rule from a ranking rule library, wherein the ranking rule comprises criteria for evaluating a degree of influence of an object on the root object with respect to a particular sales opportunity, analyze a plurality of objects associated with the list of object identifiers according to the ranking rule to generate an ordered list, and generate a graphical user interface (GUI) comprising a graphical representation of the ordered list comprising a plurality of icons representing the plurality of objects associated with the list of object identifiers and an icon representing the root object, wherein the plurality of icons representing the plurality of objects are sized and positioned relative to the icon representing the root object according to ordered list.

The following detailed description and accompanying drawings provide a better understanding of the nature and advantages of the present invention.

DETAILED DESCRIPTION

Described herein are techniques for determining a ranked list of influential people for a particular sales opportunity based on analysis of explicit and inferred connections between a particular user (e.g., a salesperson) and a identified contact (e.g., a purchasing manager). In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
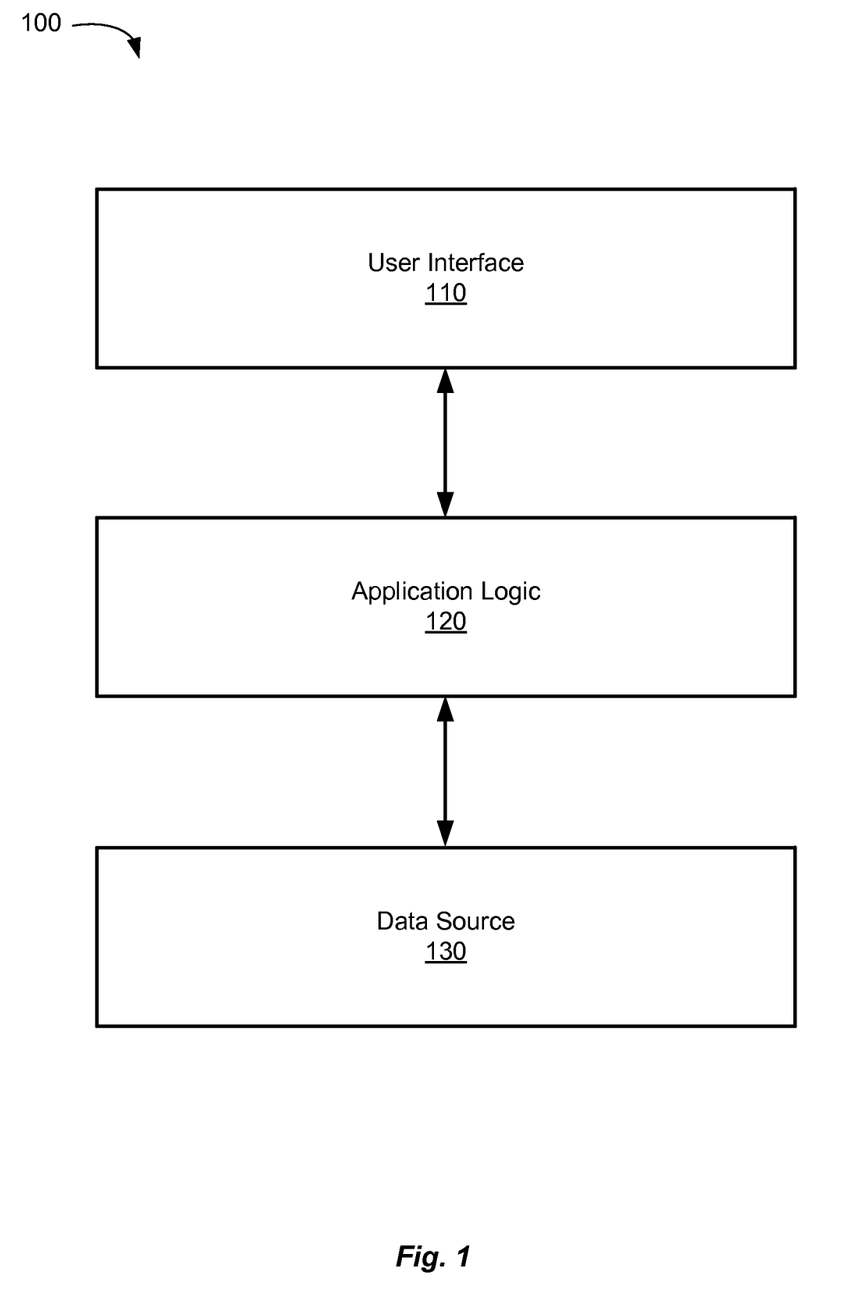
FIG. 1 illustrates a high level system architecture in which various embodiments can be implemented.

FIG. 1 illustrates a high level system 100 according to one embodiment. System 100 is an application implemented in computer code that can be executed on the server side, the client side, or a combination of both. In one embodiment, system 100 is executed using a plurality of computers communicating with one another via the Internet to provide sales tools in the cloud for selling sales items. A sales item can be a product or service that is placed on sale or available for license. For example, a product for sale can be a pharmaceutical drug, a service for sale can be housekeeping services, and a product for license can be a software license for a software application. The sales tool can be configured for a different phases of the sales process. In some embodiments, the sales tools provided can include identifying sales opportunities to sell sales items to customers, predicting the outcome of a given sales opportunity, identifying key decision maker for a sales opportunity, and recommending influential people that can help convert the sales opportunity into a successful sales deal.

System 100 includes user interface layer 110, application logic layer 120, and data source layer 130. Data source layer 130 includes a variety of data sources containing data that is analyzed by sales tools stored in application logic layer 120. In one example, data source layer 130 includes data about a company. This can include information about the sales force of the company, information about the sales items that the company offers for sale, and information about customers of the company. In another example, data source layer 130 includes data about sales opportunities. This can include information about potential customers and existing customers, such as customer needs, prior sales deals, and other data related to the customer. In yet another example, data source layer 130 includes information about people outside the company. In yet other examples, other types of data related to the company, competing companies, sales items, and customers can be stored in data source layer 130. For instance, news related to sales items (e.g., recalls, updates to FDA approval, etc.) and customers (e.g., upcoming IPOs, lawsuits, etc.) can also be a part of data source 130. In some embodiments, the data sources that make up data source layer 130 can be stored both locally and remotely. For example, company sensitive information such as information about existing customers or the sales force of the company can be stored and managed in local databases that belong to the company while information about other people not within the company can be periodically retrieved from a remote source such as a social networking website.

Application logic layer 120 is coupled to data source layer 130. Application logic layer 120 includes one or more sales tools that can be utilized by a sales force to help sales people in the sales force successfully close sales deals. The sales tools can analyze the collective knowledge available from data source layer 130 to predict the outcome of a sales opportunity. The sales tool can also provide recommendations that may improve the chance of success of the sales opportunity. In one embodiment, a sales tool can be a deal finder that helps a salesperson identify potential deals (e.g., sales opportunities) with existing and potential clients. In another embodiment, a sales tool can be a deal playbook that helps a salesperson identify the combination of sales team, sales items, and/or that would most likely lead to a successful sales deal. The sales team can include people that the salesperson directly knows and people that the salesperson does not directly know. People who can improve the success rate of the sales deal are known as key influencers. In another embodiment, a sales tool include a spiral of influence that identifies people who can potentially influence a given contact related to a sales opportunity. In one example, this can include the key influencers mentioned above. In another example, the spiral of influence can evaluate relationships between the salesperson and a key influencer to identify people who can potentially introduce the salesperson to the key influencer. This can include analyzing relationship information of the sales force and ranking the relationship information to derive a level of influence for people that can potentially introduce the given salesperson to the key influencer.

User interface layer 110 is coupled to application logic layer 120. User interface layer 110 can receive user input for controlling a sales tool in application logic layer 120. User interface layer 110 can interpret the user input into one or more instructions or commands which are transmitted to application logic layer 120. Application logic layer 120 processes the instructions and transmits the results generated from application logic layer 120 back to user interface layer 110. User interface layer 110 receives the results and presents the results visually, audibly, or both. In one embodiment, user interface layer 110 can present a landing page that presents information related to a particular user such as information on existing and future sales opportunities and sales deals. The status of sales opportunities can be monitored and tasks can be performed from the landing page.

Figure 2:
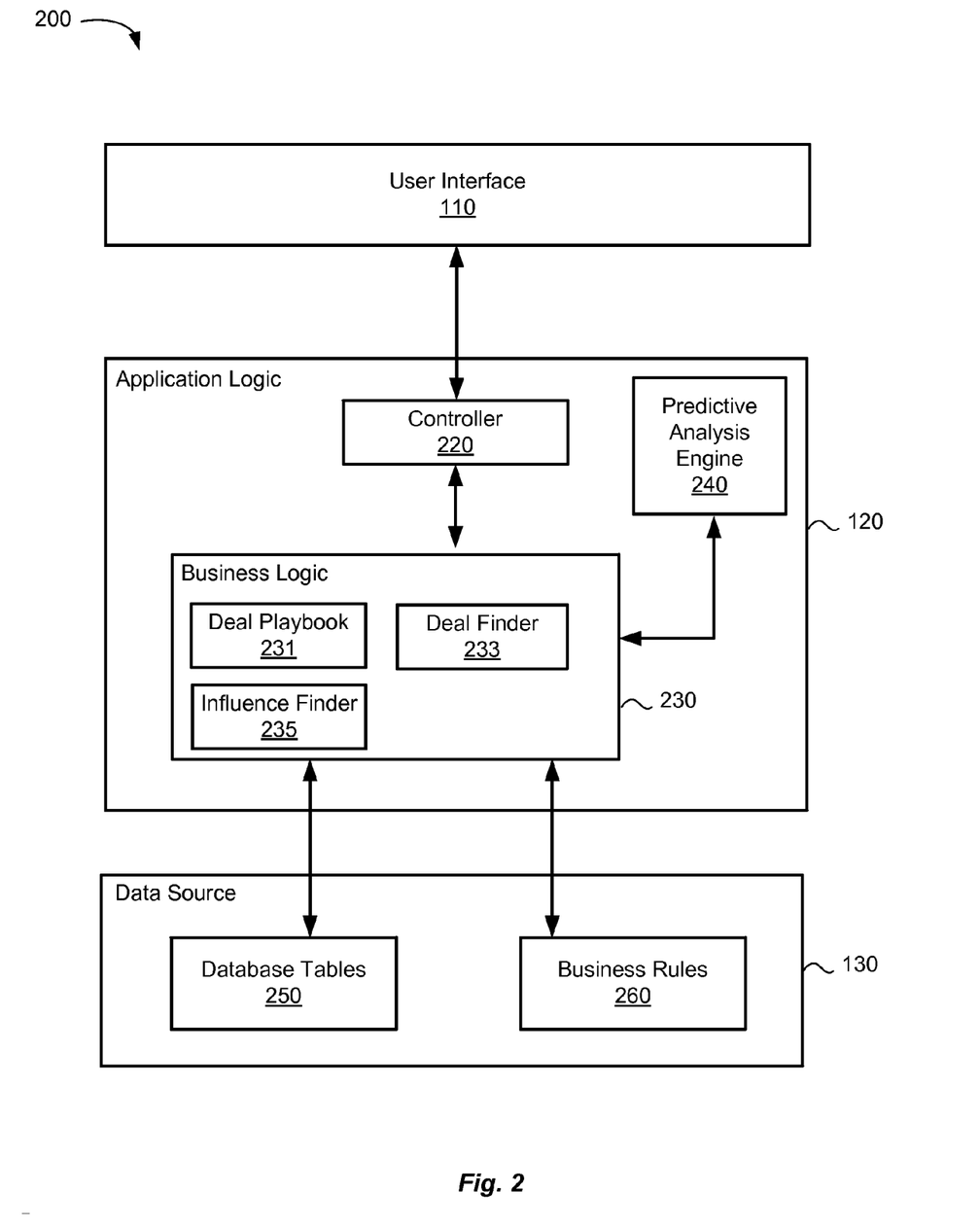
FIG. 2 illustrates a system diagram according to one embodiment of the present disclosure.

FIG. 2 illustrates a system 200 according to one embodiment. System 200 is an application implemented in computer code that can be executed on the server side, the client side, or both. For example, user interface 110 can be executed on the client while application logic 120 and data source 130 can be executed on one or more servers. System 200 can a sales application for selling sales items. In one embodiment, system 200 includes multiple sales tools that can be combined to manage and monitor sales opportunities and sales deals. Application logic 120 includes controller 220, business logic 230, and predictive analysis engine 240. Controller 220 is configured to control the operations of system 200. Controller 220 receives user input from user interface 110 and translates the user input into a command which is communicated to business logic 230. A procedure from business logic 230 that corresponds with the command can be called by controller 220 to process the command. Business logic 230 can include a deal playbook 231, deal finder 233, influence finder 235, and other sales tools.

When processing the command, the procedure (which can be one of deal playbook 231, deal finder 233, or influence finder 235) can communicate with data source 130. More specifically, the procedure can retrieve data from database tables 250 and business rules 260 of data source 130 for analysis. Database tables 250 can store data in different tables according to the data type and business rules 260 can store rules to be met when business logic 230 processes the data in database tables 250. In one example, the database tables in database tables 250 can store various types of data. The analysis performed by the procedure can include transmitting data retrieved from database tables 250 to predictive analysis engine 240 for processing. Predictive analysis engine 240 can be configured to analyze received data or rules to provide predictions. In some embodiments, the predictions can include potential sales opportunities for a particular salesperson, the outcome of a potential sales opportunity, and influential people who can help transform a sales opportunity into a successful sales deal. Once results are generated by the procedure of business logic 230, the results can be communicated to controller 220, which in turn communicates the results to user interface 110 for presentation to the user.

Figure 3:
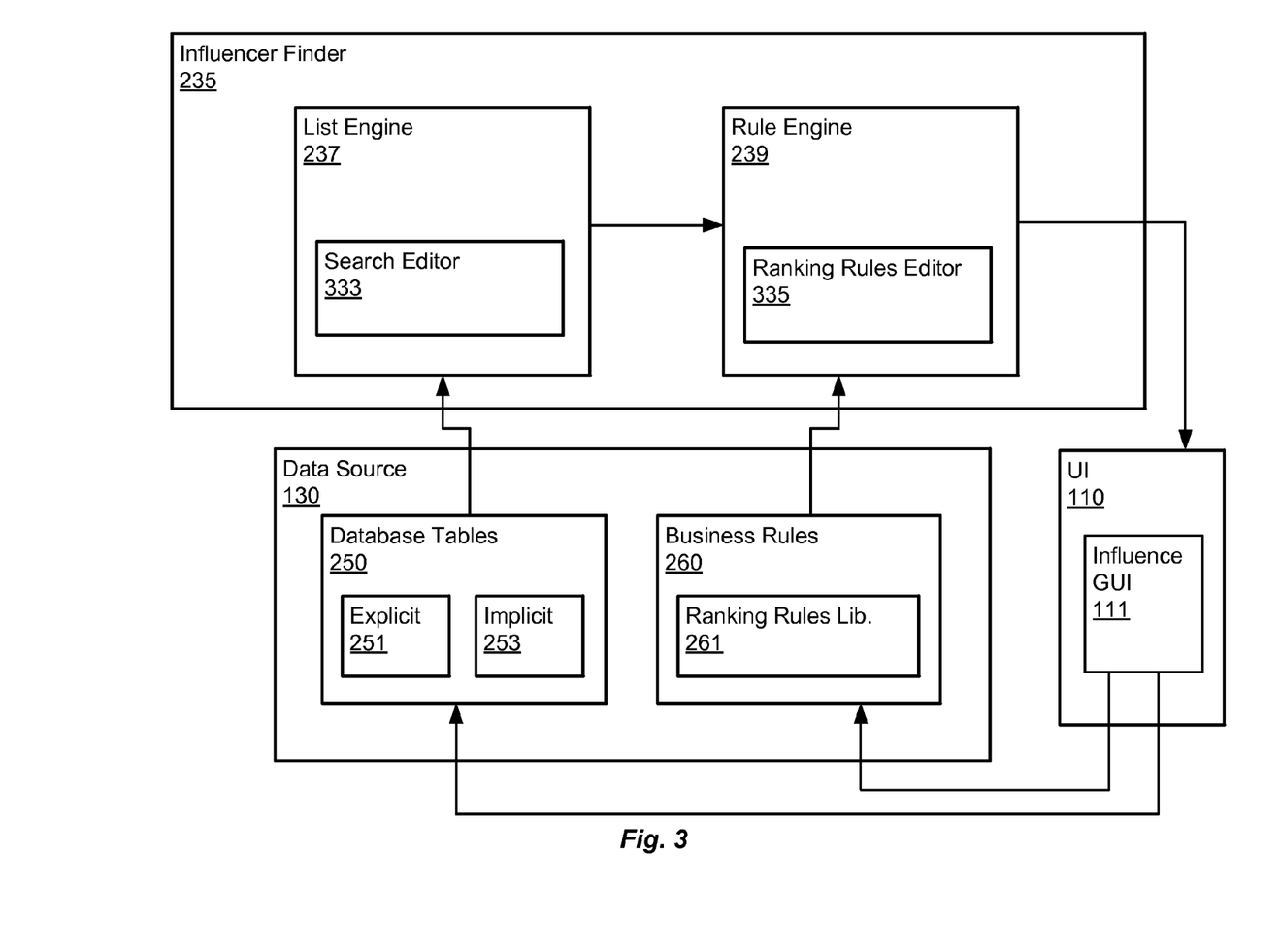
FIG. 3 illustrates an example configuration of business logic for an influencer finder, according to one embodiment of the present disclosure.

FIG. 3 illustrates the influence finder 235 business logic according to one embodiment. The influence finder 235 can search for influential people who may positively impact a particular sales opportunity with which a particular identified contact is involved. While many individuals may be identified as potential influencers, the influence finder 235, with the help of the predictive analysis engine 240, may analyze information in the data source 130 to predict which potential influencers will have the most positive impact on successfully communicating with, negotiating with, and/or closing a deal with the identified contact involved with the sales opportunity. To predict which influencers may be the most positively influential, the influence finder 235 may first generate a list of potential influencers and then rank that list of potential influencers by the degree of influence they might have over the identified contact.

In one embodiment, the list engine 237 handles the initial search of the database tables 250 for other individuals, such as other contacts within the target customer entity and fellow employees (i.e., other members of the sales team) that have an explicit or implicit connection with the identified contact. Database tables 250 may include records, entries, and other data stored in or provided by internal systems (e.g., CRM systems, contact databases, etc.) as well as external systems (e.g., social networking media, purchased contact data lists, etc.)

To determine which individuals have explicit connections with the target contact, the list engine 237 may run a search of explicit contact relationship data tables 251. The explicit contact relationship data tables 251 may include contact list information from multiple sales people. The contacts list information can be uploaded from sales people's individually maintained contact lists. Contact list information may include specific information about a particular contact. For example, contact information may include the name, title, company affiliation, address, website, email address, telephone number, product responsibilities, project involvements, newsfeeds, updates, anniversary dates, reminders, group affiliations, involvements in past, present, or future deals.

The existence of a particular contact within an individual salespersons contact list represents an explicit connection with that particular contact. While each contact may only exist in one of the individual sales people's contact list, it is possible that some contacts may exist in more than one of the individual sales peoples contact lists. In such scenarios, contacts may be connected to one or more of the sales people. Because inherent connections can be assumed between salespeople on the same sales team, it is possible to determine the degree of separation between one contact and an individual salesperson based on a connection through one or more common connections. Thus, if one sales person is not connected with a particular identified contact, it is possible that that salesperson may be connected to another contact or other salesperson who is. Accordingly, although the identified contact may not be directly connected to a particular salesperson (i.e. a first-degree connection), the identified contact and the salesperson may still be connected through one or more other explicit connections through other contacts and salespeople (i.e. a second, third . . . Nth degree connection).

In some embodiments, the explicit contact relationship data tables 251 can include connections between salespeople and various contacts based on information provided by a third-party business or social networking service (e.g., LinkedIn™, Facebook™, etc.). Such networking services may list both the direct first-degree connections amongst various individuals as well as indirect or higher-degree connections between various individuals in the network.

To determine which individuals have implicit connections with the identified contact, the list engine 237 may run a search of the implicit contact relationship data tables 253. Implicit contact relationship data tables 253 may include any type of business data from which a previous relationship or business dealing between two individuals may be inferred. For example, implicit contact relationship data tables may include records for transactions with multiple transaction attributes for which corresponding attribute values are stored. For example, some of the transactions, such as past sales or sales opportunities, may include an attribute for the names of individuals who were involved in the transaction. Specifically, a sales transaction may list the name of the identified contact as an attribute value for an attribute that designates individuals who were involved in the sale. In some embodiments, implicit connections between the identified contact and other individuals may be inferred by identifying transactions that include the identified contact and at least one other individual.

Accordingly, the list engine 237 can construct a search based on an identifier (e.g., a name identification code) associated with the identified contact. The list engine 237 may then search both the explicit contact relationship data tables 251 and the implicit contact relationship with data tables 253 for records that include the identified contact. The list engine 237 may examine the records in which the identified contact is included to identify other individuals also included in those records as potential influencers.

By examining the number of explicit and implicit connections between a particular user, such as the initiating salesperson, and the potential influencers, the list engine 237 can also determine and store the degree or strength of the connections. For example, a potential influencer to whom the user and the identified contact are both directly connected by either an explicit or implicit connection may be a first-degree connection to both the user and the identified contact. However, the potential influencer may be connected to a potential influencer by two or more explicit or implicit connections would have a second-degree connection with that potential influencer, while the user may be have a direct first-degree connection with that potential influencer because the potential influencer is included in his personal contacts list.

In some embodiments, the degree or strength of the connection the potential influencers relative to the identified contact and/or the initiating user may be stored. The degree of the connection may be stored as a number representative of the number of implicit or explicit connections between two individuals.

The list engine 237 may include a search editor 333 with which a user may manually construct a search based on the identified contact, identifier associated with the identified contact, and other information regarding the contact, the type or degree of the connection between the contact and other individuals, and/or other information contained in the database tables 250. For example, a user may initiate the search editor 333 to edit a default potential influencer search to limit the search to include only first-degree connections to the user and/or the contact or define time period, geographic, job title characteristics associated with the records in which the contact is found.

Once the list engine 237 has identified one or more potential influencers in the database tables 250, it can compile a list of potential influencers. The list of potential influencers may include a list of names or identifiers for particular individuals as well as indications of the degree or strength of the connection between the potential influencers and the user and/or the identified contact. In addition, the list of potential influencers may also include record identifiers from which the inclusion of the potential influencers in the list of potential influencers is based. Accordingly, when the list of potential influencers is analyzed in subsequent processes, the original records in the database tables 250 may also be analyzed for additional information regarding potential influencers.

If there are only a few potential influencers included in the list of potential influencers, then the initiating user or salesperson may decide to include all the potential influencers in the particular sales opportunity to increase the potential success of closing the deal. However, if the list of potential influencers includes more than one or two potential influencers, then embodiments of the present disclosure include systems and methods for ranking the potential influencers by their level of influence. As used herein, the level of influence describes the degree to which a particular influencer or group of potential influencers might influence the identified contact or impact the successful completion of a deal based on a particular sales opportunity.

To determine the level of influence of the potential influencers in the list of potential influencers, the list engine 237 may pass the list of potential influencers to the rule engine 239 for analysis. The rule engine 239 may then retrieve one or more predetermined ranking rules from the ranking rules library 261 stored in or the administered by the business rules 260 component in the data source 130. The predetermined ranking rules in the ranking rules library 261 may include a number of criteria with which the rules engine 239 can evaluate the potential influencers in the list.

The criteria of the ranking rules or routines can be defined to generate one or more categorical scores based on the examination of the underlying data tables 250 associated with the potential influencers. For example, one categorical score may be related to the degree or strength the connection between the potential influencer and the identified contact. Accordingly, a potential influencer who is directly connected through a first-degree explicit connection with the identified contact may receive a +3 connection score. A potential influencer who is connected to the identified contact through a first-degree implicit connection with the identified contact may receive a +2 connection score. Meanwhile, a potential influencer who is indirectly connected through two or more intervening connections to the identified contact (i.e. a second-degree connection) may receive a +1 or a 0 connection score, depending on the specific criteria. Specific illustrative examples of ranking rules will be described in more detail below.

The list of potential influencers and any associated categorical scores may then be sent to the predictive analysis engine 240. The predictive analysis engine 240 may apply various predictive analysis routines, to evaluate the various categorical scores to predict what degree of influence the potential influencers might have on the identified contact. In some embodiments, the predictive analysis routines may include normalizing or weighting the categorical scores to generate a ranking for the list of potential influencers. The ranking may include an order for listing the potential influencers from the most influential to the least influential. The rule engine 239 and/or the predictive analysis engine 240 may generate the ordered list of potential influencers according to the order of the ranking.

The rule engine 239 may then send the ordered list of potential influencers to the UI 110. The UI 110 may display a visual or graphic representation of the ordered list of potential influencers in an influence graphical user interface (GUI) 111.

In some embodiments, the graphic representation of the ordered list may be in the form of a single or multi-arm spiral of icons. An icon representing the identified contact, also referred to herein as a root object, may be disposed in the center of the spiral. Other icons representing the potential influencers may then be disposed in positions in the spiral relative to the icon representing the identified contact. The positions of the icons representing the potential influencers relative to the icon representing the identified contact can be based on level of influence the corresponding potential influencer is predicted to have on the identified contact. For example, the closer an icon representing a potential influencer is to the icon representing the identified contact, the greater the predicted level of influence that the potential influencer has on the identified contact. Similarly, the farther in icon representing the potential influencer is from the icon representing the identified contact, the lower the predicted level of influence that the potential influence or has on the identified contact. Accordingly, the level of influence a potential influencer might have on the identified contact varies inversely with the distance of the corresponding icon from the icon representing the identified contact.

In some embodiments, the size, shape, color, or other characteristic of the icon representing a potential influencer in the GUI 111 may indicate one or more other characteristics, properties, or attributes associated with the corresponding potential influencer. For example, icons representing potential influencers that are connected to the initiating user or salesperson and the identified contact by a first-degree connection can be differentiated from other icons to quickly indicate to the initiating user which of the potential influencers are common contacts. To differentiate the potential influencers having specific differentiating characteristics, properties, or attributes, the corresponding icons can be rendered as a different size, shape, or color than the other icons (e.g., icons representing common first-degree connections can be rendered larger than the other icons).

By providing for differentiated icons representing potential influencer's multidimensional information about the potential influencers can be displayed in an easy-to-read GUI 111. Specifically, while the position of the icons representing the potential influencers relative to the icon representing the identified contact can indicate the corresponding levels of influence, different shaped icons can indicate which potential influencers are colleagues of the initiating user (e.g., a square icon), colleagues of the identified contact (e.g., a triangle icon), with color coding to indicate their roles within the respective organizations (e.g., managers are rendered as red, project managers rendered as green, accountants and officers rendered as yellow, etc.).

GUI 111 may also include controls or other mechanisms for receiving user input to provide feedback to the data tables 250 and business rules 260 stored in the data source 130. Such mechanisms allow a user to manually override the predicted level of influence that any particular potential influencer may be predicted to have over the identified contact. In some embodiments, the GUI 111 may include the ability to receive input representative of dragging one or more of the icons to another location in or out of the spiral. For example, a user may move an icon representing a particular potential influencer positioned directly next to the icon representing the identified contact if the user knows that the corresponding potential influencer is no longer relevant to the particular sales opportunity (e.g., an icon representing a purchasing manager who has recently left the customer company may have little to no influence over the targeted contact now that he or she has left the company). Accordingly, the icon representing the potential influencer has no influence on the identified contact can be removed or deleted from the spiral. However, if the potential influencer has simply changed roles or divisions within the company to which the identified contact is associated, then the icon representing the potential influencer can be moved to a position farther away from the icon representing identified contact.

In some embodiments, input representing the repositioning of an icon of the potential influencer can be used as feedback to update the data stored in the data source 130. Updating the data stored in the data store 130 can include updating information stored in the data tables 250 and/or rules or criteria stored in the business rules 260 or ranking rules library 261. Accordingly, the next time that that individual is identified as a potential influencer for another sales opportunity the rank in which that individual is listed in the ordered list of potential influencers can be based on the updated information in the data source 130. The feedback loop between the influence GUI 111, the data source 130, the list engine 237, and the rule engine 239 allows the influencer finder 235 iteratively learn to improve its predictive capabilities with respect to the level of influence of potential influencers on a given identified contact.

Figure 4:
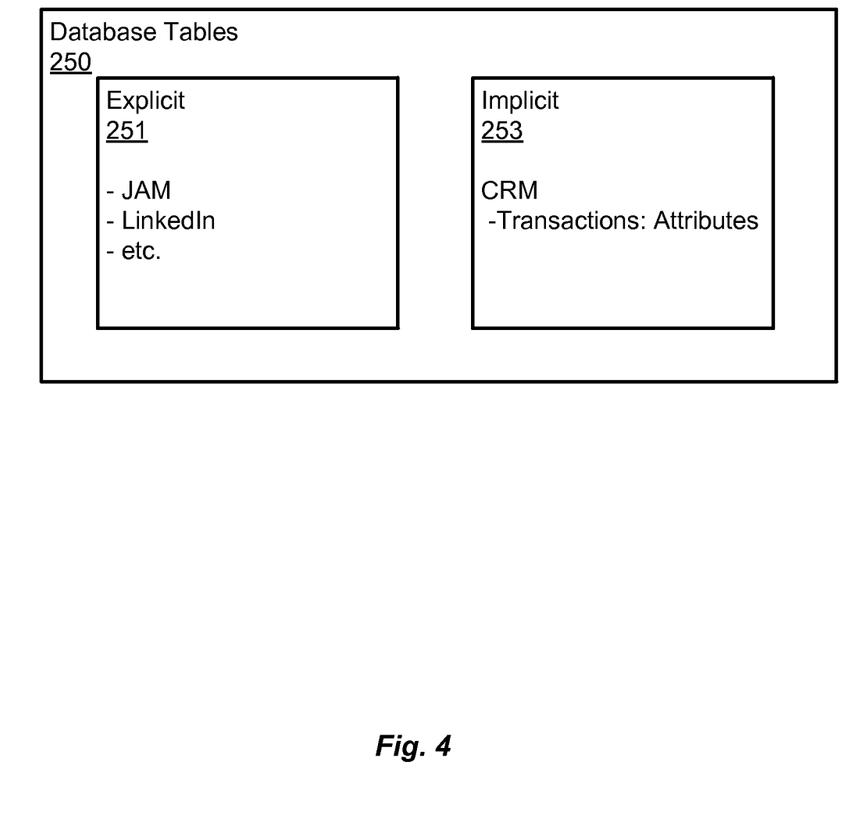
FIG. 4 illustrates examples of database tables from which contact relationship data may be determined, according to one embodiment of the present disclosure.

FIG. 4 depicts a detailed view of the database tables 250 that can be used by various embodiments of the present disclosure. As shown, the database tables 250 include both explicit contact relationship data tables 251 and implicit contact relationship data tables 253.

The explicit contact relationship data tables 251 may include various databases and tables that include direct connection data. For example, the explicit data tables 251 may include information or files from systems such as social collaboration and networking solutions, such as SAP Jam™ or LinkedIn™. The explicit data tables 251 may also be populated with information imported from individual contact lists individually maintained by various members of a particular sales team.

The implicit contact relationship data tables 253 may include any type of business information or data that can be analyzed to extract inferred relationship information. As shown, the implicit relationship content data tables 253 may be or be derived from records in a customer relationship management (CRM) system. Such records may include record identifiers (e.g. account names or numbers), transactions (e.g., sales, leads, opportunities, emails, telephone calls, etc.) with descriptions of various attributes (e.g., sales team members, product, attendees, participants, partners, etc.) and specific corresponding attribute values for the various attributes (e.g., the name of salespeople on the sales team, the name or designation of the product, or names of attendees, participants, and partners). The record identifiers, transactions, attributes, and attribute values can be analyzed by the rules engine according to ranking rules retrieved from the ranking rules library 261 to generate a number of categorical scores that can be used to evaluate or assess the level of influence explicit contact relationship data tables 251 potential influencer has on a identified contact. The categorical scores can be weighted and/or normalized by the predictive analysis engine 240. The weighted and/or normalized categorical scores can then be used to rank the list of potential influencers based on a predicted level of influence on a particular contact for particular sales opportunity.

Figure 5:
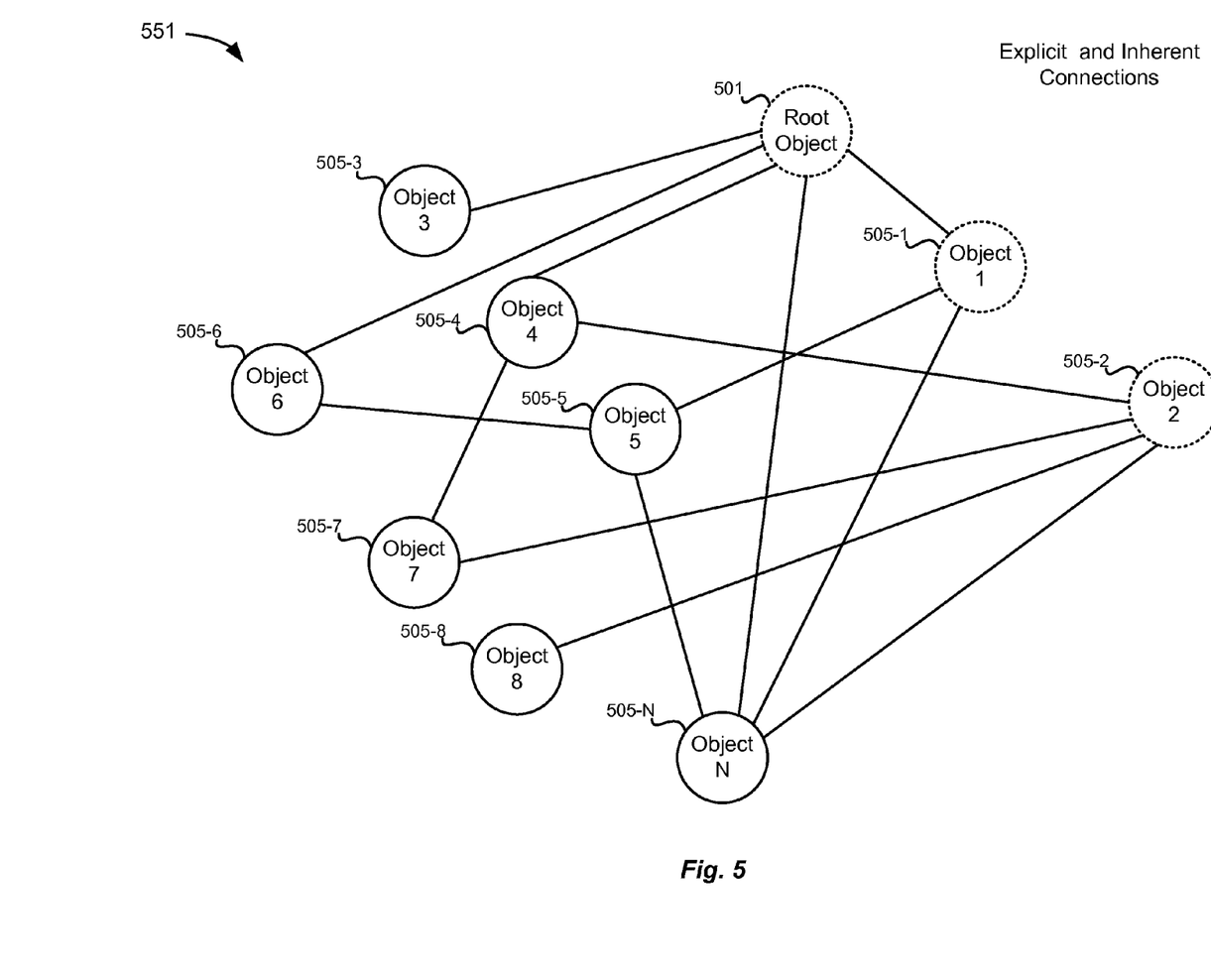
FIG. 5 illustrates a graph of explicit contact connections from which contact relationship data may be determined, according to one embodiment of the present disclosure.

FIG. 5 illustrates a graph 551 of explicit connections between a root object 501 and other objects 505. Graph 551 may be generated by analyzing contacts included in the content lists from multiple users (e.g., sales people in a sales team) or by importing connection data from collaboration or networking service. In this particular example shown, the root object 501 may represent an identified contact for a particular sales opportunity. The other objects 505 may represent other individuals that are connected directly or indirectly to the root object 501. Anyone of the objects 505 may be included in a list of potential influencers that may have some level of influence on the root object 501.

Figure 6:
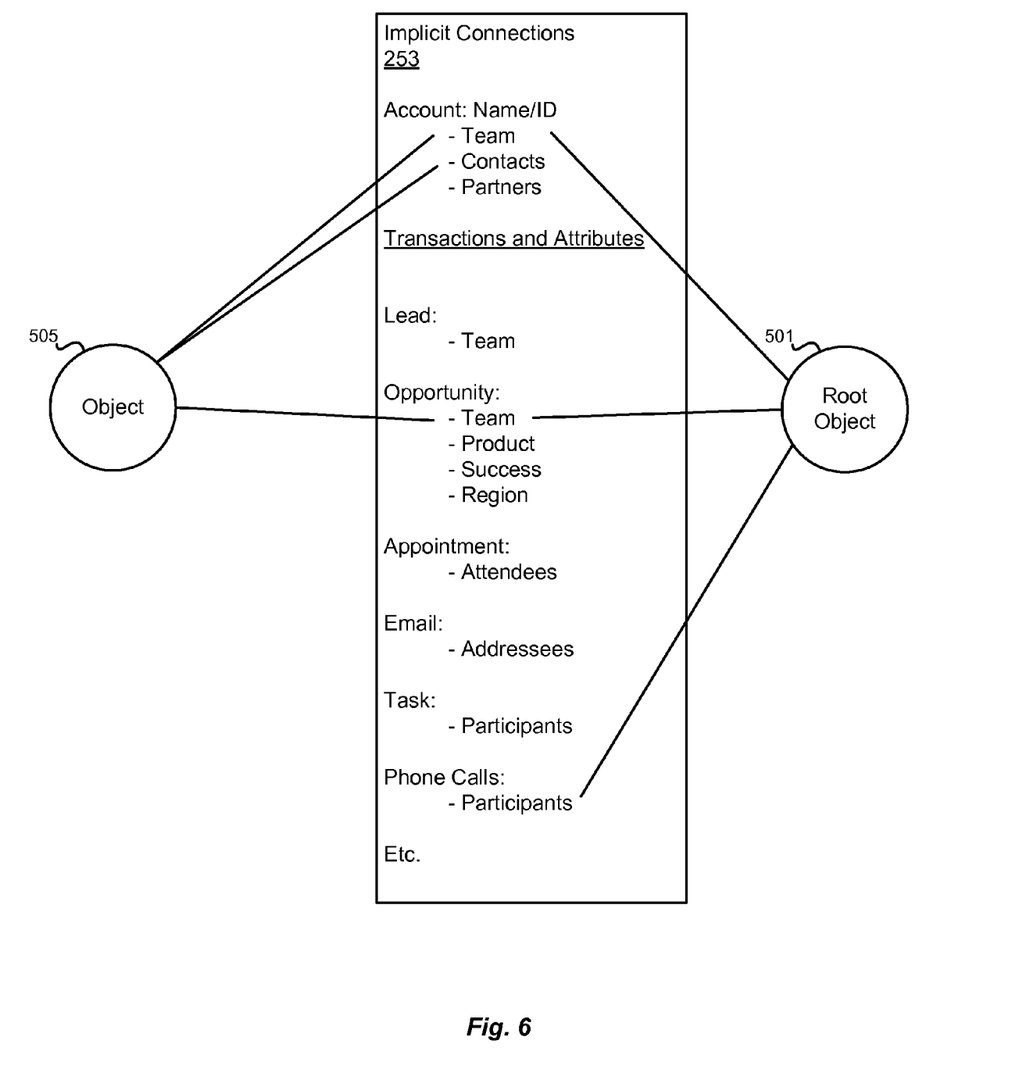
FIG. 6 illustrates various types of business data from which contact relationship data may be inferred, according to one embodiment of the present disclosure.

FIG. 6 is a specific example of the information that can be included in the implicit contact relationship data tables 253. In one embodiment, the implicit contact relationship data tables 253 may include a number of records associated with a particular account. The account may include a name or identifier (e.g., a company or business name) and include various universal information about the account. In some embodiments, the account can include information about the sales people included on the sales team designated for servicing the account, names and other contact information for the main or decision-making the context for the account, as well as any business partners they might be used to help service the account.

Records associated with a particular account may be represented by a transaction, transaction attributes, and attribute values for those attributes. For example, transactions a represent various activities or tasks stored in association with a particular account. As shown, the transactions can include leads, opportunities, appointments, emails, tasks, phone calls, etc. Transactions in turn can be associated with or include a number of attributes in the recorded values. For example, an opportunity may include a listing of team members as the attribute values for the team attribute, a product name or identifier as the attribute values for the product attribute, a designator for success or failure as the adjective value for the success attribute, any region identifier as the attribute value for the region attribute. As shown, many of the transactions include an attribute that may include one or more names or identifiers of individuals, such as contacts or employees, as attribute values. For example, a particular leave might include the designation of a number of team members, the appointment might include the designation of a number of attendees, an email transaction might include a listing of the names of addressees, task attribute might include the names of the participants of that task, and a phone call transaction may include who was on the telephone call.

Using information stored as a transaction associated with an account and having attributes and associated attribute values, the ranking rule engine 239 may evaluate the list of potential influencers according to various standard or customized criteria in order to generate a ranked ordered list of potential influencers. The rank of the potential influencers may be based on single or composite scores.

In one embodiment, the rule engine 239 may generate an advocacy score for potential influencers. To generate the advocacy score, the rule engine 239 may evaluate information in transactions associated with the identified contact to determine how many deals identified contact has been involved in. By evaluating whether not the particular deal was successful, the rule engine 239 may also determine whether not that deal was successfully closed to infer whether the involvement of the identified contact had a favorable impact in that particular opportunity. To evaluate whether that particular deal successful, the ranking rule engine 239 may examine transaction data for an attribute that indicates whether the particular sales opportunity was successful.

In another embodiment, the rule engine 239 may generate a sentiment score for potential influencers. To generate the sentiment score, the rule engine 239 may analyze additional information in transactions associated with the identified contact determined the average sentiment of the most recent available posts by the potential influencer. For example, the rule engine 239 may examine transactions stored in the implicit contact relationship data tables 253 that include information about recent posts to social media services (e.g. Facebook™ or Twitter™), recent posts to user forums, answers to surveys, etc. the sentiment score can be evaluated with reference to the tone of the responses or posts with respect to the company, brand, or product of interest. In some embodiments, the rule engine 239 may actively gather the information from the various sources in order to accurately manipulate the data to evaluate the sentiment score.

And yet another embodiment, the rule engine 239 may generate an engagement score for potential influencers. The engagement score is a measure of how engaged particular individual is with respect to a company, brand, product, or industry. The rule engine 239 evaluate how often the potential influencer is active in company, brand, product, or industry forums associated with the product or identified contact for particular sales opportunity. Similarly, the rule engine 239 can evaluate how often that the potential influencer visits the company's website or downloads product information. All such engagement activity may be stored as an attribute value related to a particular transaction stored in the implicit contact relationship data tables 253.

The individual scores may be weighted and are combined to generate a composite score that can be used to evaluate the potential level of influence that one potential influencer may have on the identified contact. To illustrate this, a number of illustrative examples will now be described in more detail.

In one example scenario, a user may wish to find all contacts that were part of an opportunity in which the identified contact was also a participant. Of those contacts, any contacts involved in opportunities that were successful, also referred to herein as won, may receive an advocacy score of +3. The contacts, who were involved in opportunities that were unsuccessful, also referred to herein as lost, may receive an advocacy score of +2. The rest of the contacts who were part of any past opportunity with the identified contact may receive an advocacy score of +1. In related embodiments, sentiment and engagement scores can be added to the weighted advocacy scores to generate an estimated or predicted level of influence that the potential influencers have on the identified contact.

In another example scenario, the identified contact is a first-degree contact with respect to the initiating user. In such scenarios, the rule engine 329 can find the contacts for the account to which the identified contact belongs. Based on the contacts that are listed in the account, the advocacy scores, sentiment scores, and engagement scores can be generated and compiled as described above.

In some scenarios, it is helpful to find other employees or colleagues associated with the initiating user. Accordingly, the rule engine 239 can evaluate employees of the selling entity to evaluate their level influence over the identified contact. Any employee who has a first-degree connection with the identified contact may be scored with a +3. Any employees who were part of won opportunities in which the identified contact was involved may be scored with a +2. Any employees who are part of a lost opportunity in which the identified contact was involved may be scored with a +1. Accordingly, employees with higher scores may be determined to have a higher level influence over the identified contact than employees with lower scores.

In addition, the rule engine 239 and or the list engine 237 can determine some number of potential influencers by applying filters to the criteria used to search and/or evaluate the information stored in the database tables 250. To apply filters, a user might initiate the ranking rules editor 335 or the search editor 333. For example, the search and/or the criteria may include a definition of a filter that limits the results to a particular product, the geographic region, or a time period.

Figure 7:
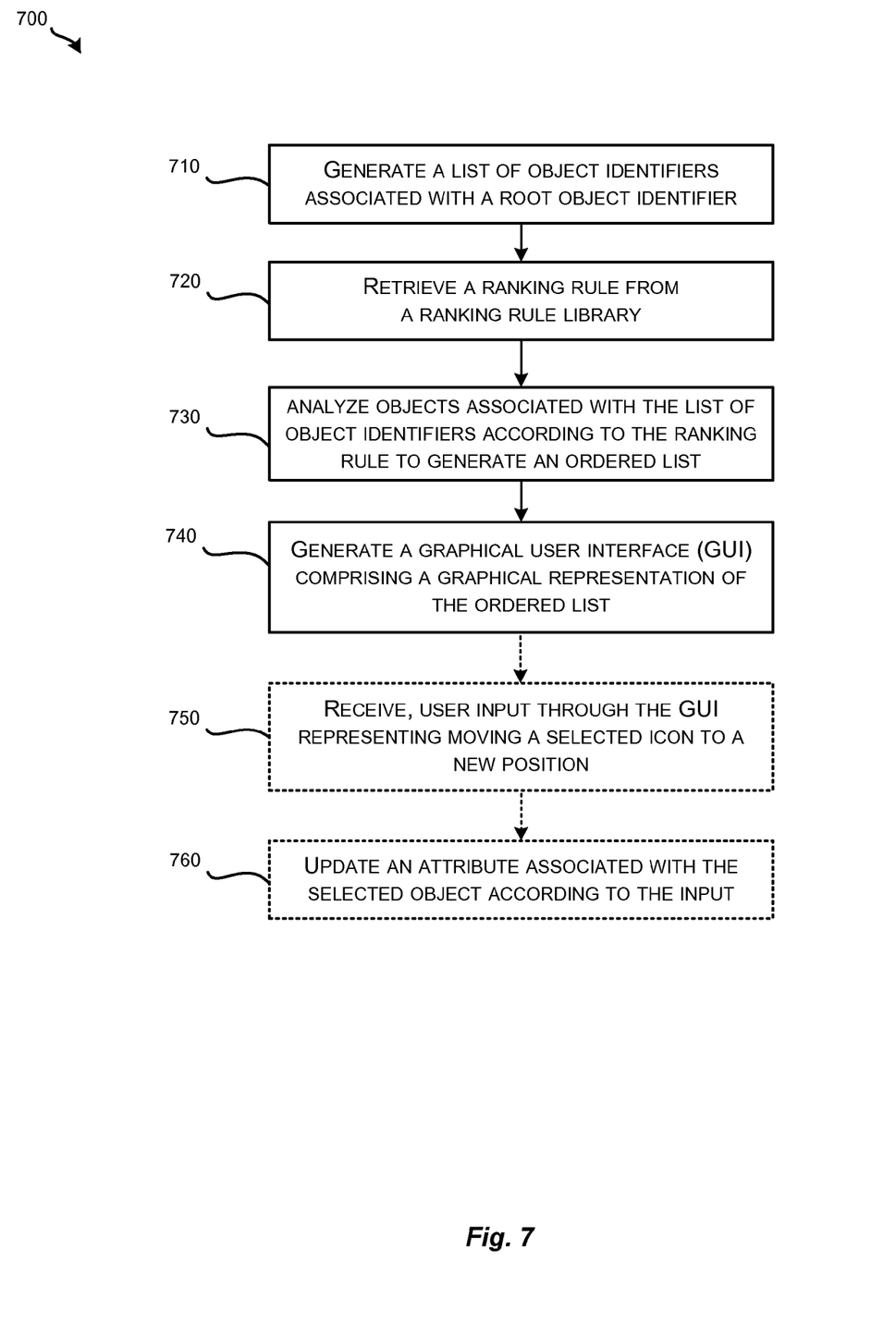
FIG. 7 is a flow chart of a method for determining and ranking potentially influential people for a given contact, according to one embodiment of the present disclosure.

FIG. 7 is a flowchart of a method 700 for predicting the level of influence various individuals may have on an identified contact for a particular sales opportunity. The purposes of FIG. 7, the term "object" may include anything for which information is stored in the data source 130. Accordingly, an individual or person, be it an employee or contact, may be represented by an object. The term object identifier may include the person's name or identification code. Similarly, the term "root object" may refer to the identified contact and the term "root object identifier" may include any name or code for referring to the root object in the data source 130.

Method 700 begins at action 710, in which the influencer finder 235 generates a list of object identifiers associated with a root object identifier. In some embodiments, the list of object identifiers includes the names of any and all contacts or employees who are explicitly connected to the identified contact represented by the root object identifier. In other embodiments, the list of object identifiers includes the names of any and all contacts or employees that are listed as having been involved in a project, opportunity, deal, etc., in common with the identified contact. For example, the influencer finder 235 can search the data stored in the database tables 254 for records in which the root object identifiers included. From those records, the influencer finder 235 can extract object identifiers that are also included in all or some of the transactions represented in those records. The object identifiers can be compiled into a list.

In action 720, the influencer finder 235 can retrieve a ranking rule from the ranking rule library 261. The ranking rule may include a number of criteria with which the influencer finder 235 can evaluate and/or predict the level of influence the objects in the list of objects might have on the root object. The retrieved ranking rule may include a default set of criteria. Alternatively, the retrieved ranking rule may include set of criteria customized for particular user or sales opportunity. Specifically, the retrieved ranking rule may start out as a default but may end up being a customized to the criteria in response to user input received through the ranking rules editor 335.

In action 730, the influencer Finder 235 can analyze some or all of the objects in the list of objects according to the retrieved or customized ranking rule. For example, the criteria of the ranking rule may require that a potential influencer represented by a particular object must have a first-degree connection with the identified contact represented by the root object. Such criteria are often referred to herein as filters. Alternatively, the criteria might include specific definitions of rules for signing weighted scores designed to evaluate various characteristics of the connection between the object and the root object (e.g., advocacy scores, engagement scores, and sentiment scores, etc.). In some embodiments, the influencer finder 235 may include a call to a predictive analysis engine 240 to apply the appropriate weighted or normalized analysis to the results of the criteria and scoring. Accordingly, the objects in the list of objects may be associated with a score or other numerical value that indicates the predicted level of influence that the object might have on the root object. In terms of contacts, the score or numerical value describes the level of influence we describe how likely it is that one individual (i.e., the object), might have on the identified contact (i.e., the root object). The; objects may then be ranked according to score or numerical value. The ordered list of objects may then be generated based on the ranking of the objects.

It action 740, the influencer finder 235 may generate in a graphical user interface a graphical representation of the ordered list. The graphical representation of the ordered list may include any type of graphical representation that represents the predicted level of influence that one object might have on the root object based on the relative placement of icons. For example, an icon that represents the root object may be placed in the center of the graphic representation. Other icons representing the objects may then be disposed in positions varying distances from the icon representing the root object. Icons for objects that are disposed closer to the icon representing the root object can have a higher level of predicted influence, while icons for objects disposed farther from the icon into the root object have a lower level of predicted influence.

In one embodiment, the icon representing the root object is placed at the center. Icons representing other objects are disposed relative to the icon or visiting the root object in a spiral formation and radiate outward from the center. Objects with icons positioned closer to the center of the spiral may be interpreted as having a higher level of influence over the root object, than those objects with icons positioned farther out in the spiral.

In optional action 750, the influencer finder 235 may receive input through the GUI representing moving a selected icon to a new position in the graphic representation of the ordered list. For example, the input may represent dragging a selected icon representing a selected object to a new location in or out of the spiral. In optional action 760, the influencer finder 235 can update an attribute associated with the selected object according to the input. By allowing a user to move icons within the spiral, the influencer finder 235 provides a mechanism for receiving manual user override feedback for updating information stored in the data source 130.

Figure 8:
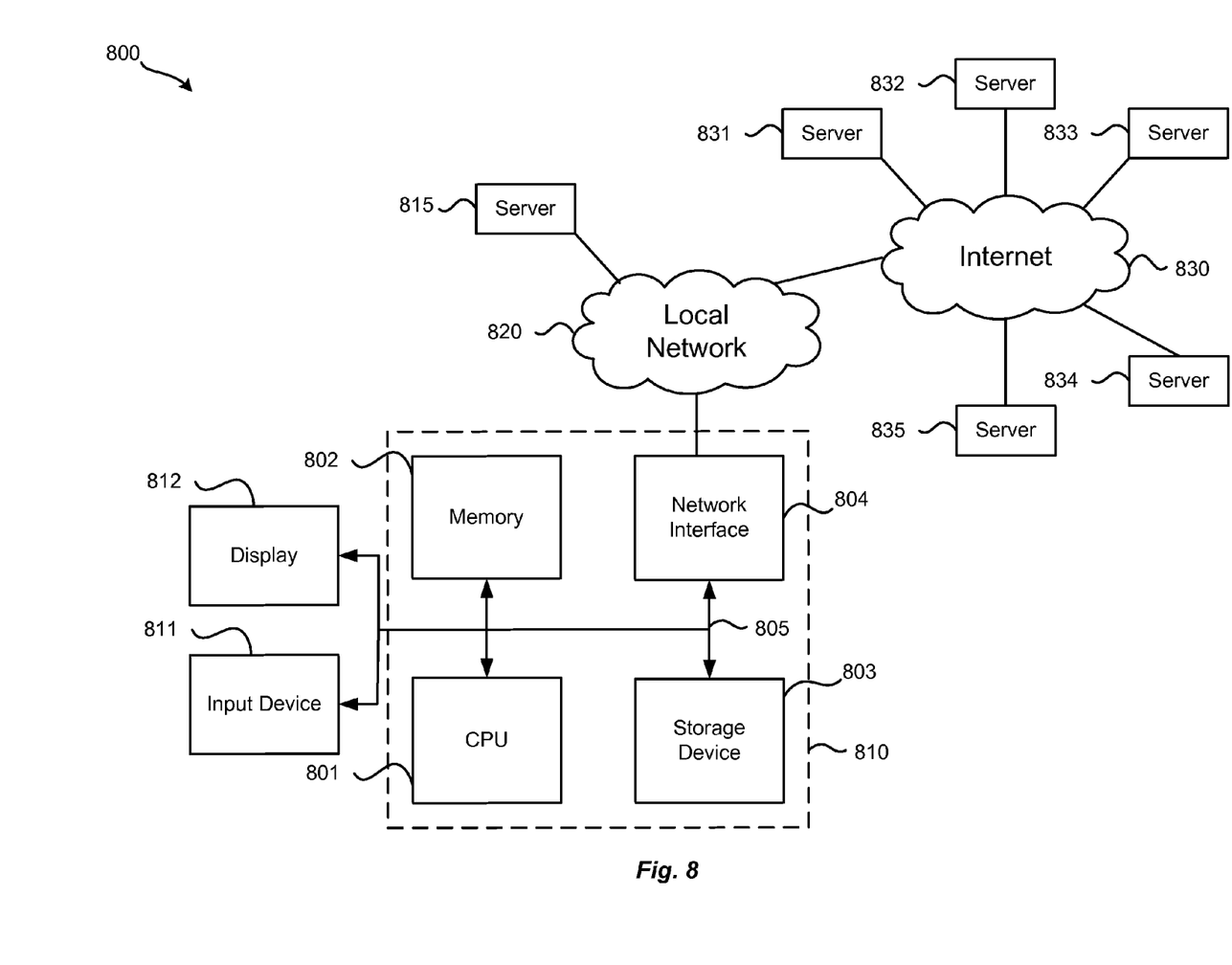
FIG. 8 illustrates an example computer system in which various embodiments of the present can be implemented.

An example system 800 is illustrated in FIG. 8. Computer system 810 includes a bus 805 or other communication mechanism for communicating information, and one or more processor(s) 801 coupled with bus 805 for processing information. Computer system 810 also includes a memory 802 coupled to bus 805 for storing information and instructions to be executed by processor 801, including information and instructions for performing some of the techniques described above, for example. This memory may also be used for storing programs executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory are both examples of non-transitory computer readable storage mediums.

Computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

Computer system 810 also includes a network interface 804 coupled with bus 805. Network interface 804 may provide two-way data communication between computer system 810 and a local network 820. The network interface 804 may be a wireless or wired connection, for example. Computer system 810 can send and receive information through the network interface 804 across a local area network, an Intranet, a cellular network, or the Internet, for example. One example implementation may include a browser executing on a computing system 810 that renders interactive presentations that integrate with remote server applications as described above. In the Internet example, a browser, for example, may access data and features on backend systems that may reside on multiple different hardware servers 831-835 across the network. Servers 831-835 and server applications may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
generating, by a computer system, a list of object identifiers associated with a root object identifier;
retrieving, by the computer system, a ranking rule from a ranking rule library, wherein the ranking rule comprises criteria for evaluating a degree of influence for each of a plurality of objects associated with the list of object identifiers on the root object with respect to a particular sales opportunity;
analyzing, by the computer system, the plurality of objects according to the ranking rule to generate an ordered list;
generating, by the computer system, a graphical user interface (GUI) comprising a graphical representation of the ordered list, the graphical representation including a plurality of icons representing the plurality of objects associated with the list of object identifiers and a root icon representing the root object, wherein the plurality of icons representing the plurality of objects are sized and positioned relative to the root icon representing the root object according to ordered list and wherein the plurality of icons are directly or indirectly linked with the root icon;
receiving, by the computer system, user input through the graphical user interface representing moving a selected icon from the plurality of icons to a new position in the GUI such that the selected icon remains directly or indirectly linked with the root icon; and
updating, by the computer system, an attribute associated with an object represented by the selected icon according to the user input.

2. The method of claim 1 wherein generating the list of object identifiers comprises:
receiving, by the computer system, the root object identifier associated with the root object, wherein the root object is associated with the particular sales opportunity;
searching, by the computer system, a database comprising records having attributes and corresponding attribute values, for a plurality of records in which the root object identifier is included as an attribute value for at least one attribute; and
identifying, by the computer system, a plurality object identifiers also included as attribute values for an attribute in one or more of the plurality of records.

3. The method of claim 2 wherein the criteria for evaluating the degree of influence comprise a plurality of routines for generating scores based on attribute values for particular attributes.

4. The method of claim 2 wherein searching the database comprises filtering the plurality of records by one or more attributes for which the root object identifier is included as an attribute.

5. The method of claim 1 wherein the sales opportunity comprises a description of a potential sale and the root object identifier, wherein root object comprises information regarding a person responsible for the sales opportunity, and the root object identifier comprises a name of the person.

6. A method of claim 5 wherein the criteria for evaluating the degree of influence comprise a plurality of routines for generating scores based on the information regarding the person responsible for the sales opportunity.

7. The method of claim 1, wherein the plurality of icons are linked together to form a spiral in the graphical representation.

8. A non-transitory computer readable medium comprising instructions that when executed by a computer processor cause the computer processor to be configured for:
generating a list of object identifiers associated with a root object identifier;
retrieving a ranking rule from a ranking rule library, wherein the ranking rule comprises criteria for evaluating a degree of influence for each of a plurality of objects associated with the list of object identifiers on the root object with respect to a particular sales opportunity;
analyzing the plurality of objects associated with the list of object identifiers according to the ranking rule to generate an ordered list;
generating a graphical user interface (GUI) comprising a graphical representation of the ordered list, the graphical representation including a plurality of icons representing the plurality of objects associated with the list of object identifiers and a root icon representing the root object, wherein the plurality of icons representing the plurality of objects are sized and positioned relative to the root icon representing the root object according to ordered list and wherein the plurality of icons are directly or indirectly linked with the root icon;
receiving user input through the graphical user interface representing moving a selected icon from the plurality of icons to a new position in the GUI such that the selected icon remains directly or indirectly linked with the root icon; and
updating an attribute associated with an object represented by the selected icon according to the user input.

9. The non-transitory computer readable medium of claim 8 wherein the instructions that cause the computer processor to be configured for generating the list of object identifiers further comprise instructions that cause the computer processor to be configured for:
receiving the root object identifier associated with the root object, wherein the root object is associated with the particular sales opportunity;
searching a database comprising records having attributes and corresponding attribute values, for a plurality of records in which the root object identifier is included as an attribute value for at least one attribute; and
identifying a plurality object identifiers also included as attribute values for an attribute in one or more of the plurality of records.

10. The non-transitory computer readable medium of claim 9 wherein the criteria for evaluating the degree of influence comprise a plurality of routines for generating scores based on attribute values for particular attributes.

11. The non-transitory computer readable medium of claim 9 wherein the instructions that cause the computer processor to be configured for searching the database comprises instructions that cause the computer processor to be configured for filtering the plurality of records by one or more attributes for which the root object identifier is included as an attribute.

12. The non-transitory computer readable medium of claim 8 wherein the sales opportunity comprises a description of a potential sale and the root object identifier, wherein root object comprises information regarding a person responsible for the sales opportunity, and the root object identifier comprises a name of the person.

13. A non-transitory computer readable medium of claim 12 wherein the criteria for evaluating the degree of influence comprise a plurality of routines for generating scores based on the information regarding the person responsible for the sales opportunity.

14. The non-transitory computer readable medium of claim 8, wherein the plurality of icons are linked together to form a spiral in the graphical representation.

15. A system comprising a processor and a non-transitory computer readable medium having instructions stored thereon that when executed by the processor cause the processor to be configured to:
  generate a list of object identifiers associated with a root object identifier;
  retrieve a ranking rule from a ranking rule library, wherein the ranking rule comprises criteria for evaluating a degree of influence for each of a plurality of objects associated with the list of object identifiers on the root object with respect to a particular sales opportunity;
  analyze the plurality of objects associated with the list of object identifiers according to the ranking rule to generate an ordered list;
  generate a graphical user interface (GUI) comprising a graphical representation of the ordered list, the graphical representation including a plurality of icons representing the plurality of objects associated with the list of object identifiers and a root icon representing the root object, wherein the plurality of icons representing the plurality of objects are sized and positioned relative to the root icon representing the root object according to ordered list and wherein the plurality of icons are directly or indirectly linked with the root icon;
  receive user input through the graphical user interface representing moving a selected icon from the plurality of icons to a new position in the GUI such that the selected icon remains directly or indirectly linked with the root icon; and
  update an attribute associated with an object represented by the selected icon according to the user input.

16. The system of claim 15 wherein the instructions that cause the processor to be configured to generate the list of object identifiers further cause the processor to be configured to:
  receive the root object identifier associated with the root object, wherein the root object is associated with the particular sales opportunity;
  search a database comprising records having attributes and corresponding attribute values, for a plurality of records in which the root object identifier is included as an attribute value for at least one attribute; and
  identify a plurality object identifiers also included as attribute values for an attribute in one or more of the plurality of records.

17. The system of claim 16 wherein the criteria for evaluating the degree of influence comprise a plurality of routines for generating scores based on attribute values for particular attributes.

18. The system of claim 15 wherein the sales opportunity comprises a description of a potential sale and the root object identifier, wherein root object comprises information regarding a person responsible for the sales opportunity, and the root object identifier comprises a name of the person.

19. A system of claim 18 wherein the criteria for evaluating the degree of influence comprise a plurality of routines for generating scores based on the information regarding the person responsible for the sales opportunity.

20. The system of claim 15, wherein the plurality of icons are linked together to form a spiral in the graphical representation.

* * * * *